3,282,018
APPARATUS FOR APPLYING ADHESIVE TAPE
TO CARTONS
Frederick Victor George Bixley, Newnham, Tasmania,
Australia, assignor to Newnham Industries Pty. Limited,
Newnham, Tasmania, Australia, a company of Tasmania, Australia
Filed Nov. 24, 1961, Ser. No. 154,465
Claims priority, application Australia, Mar. 10, 1961,
2,361; May 8, 1961, 4,369; Sept. 7, 1961, 8,967
8 Claims. (Cl. 53—137)

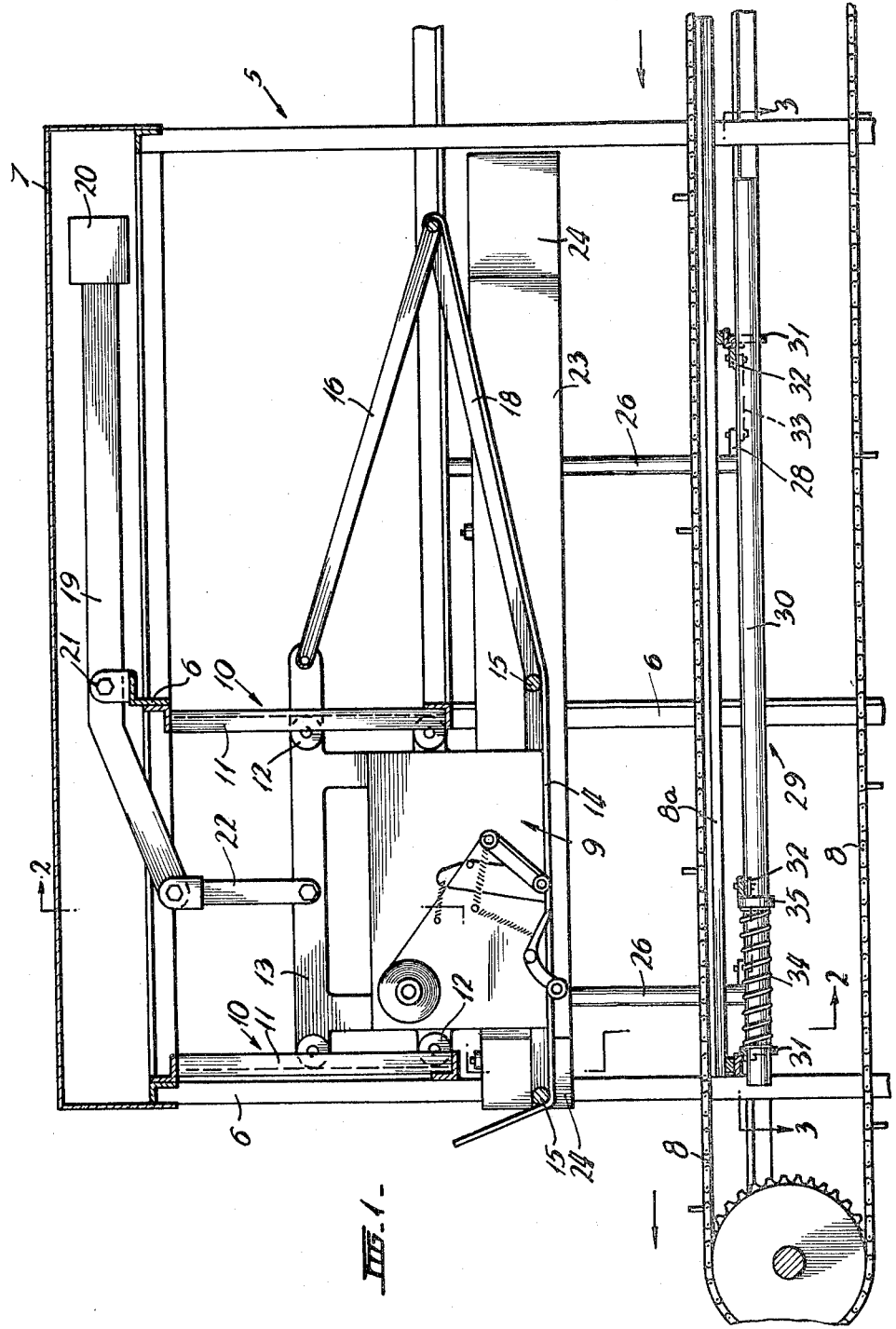

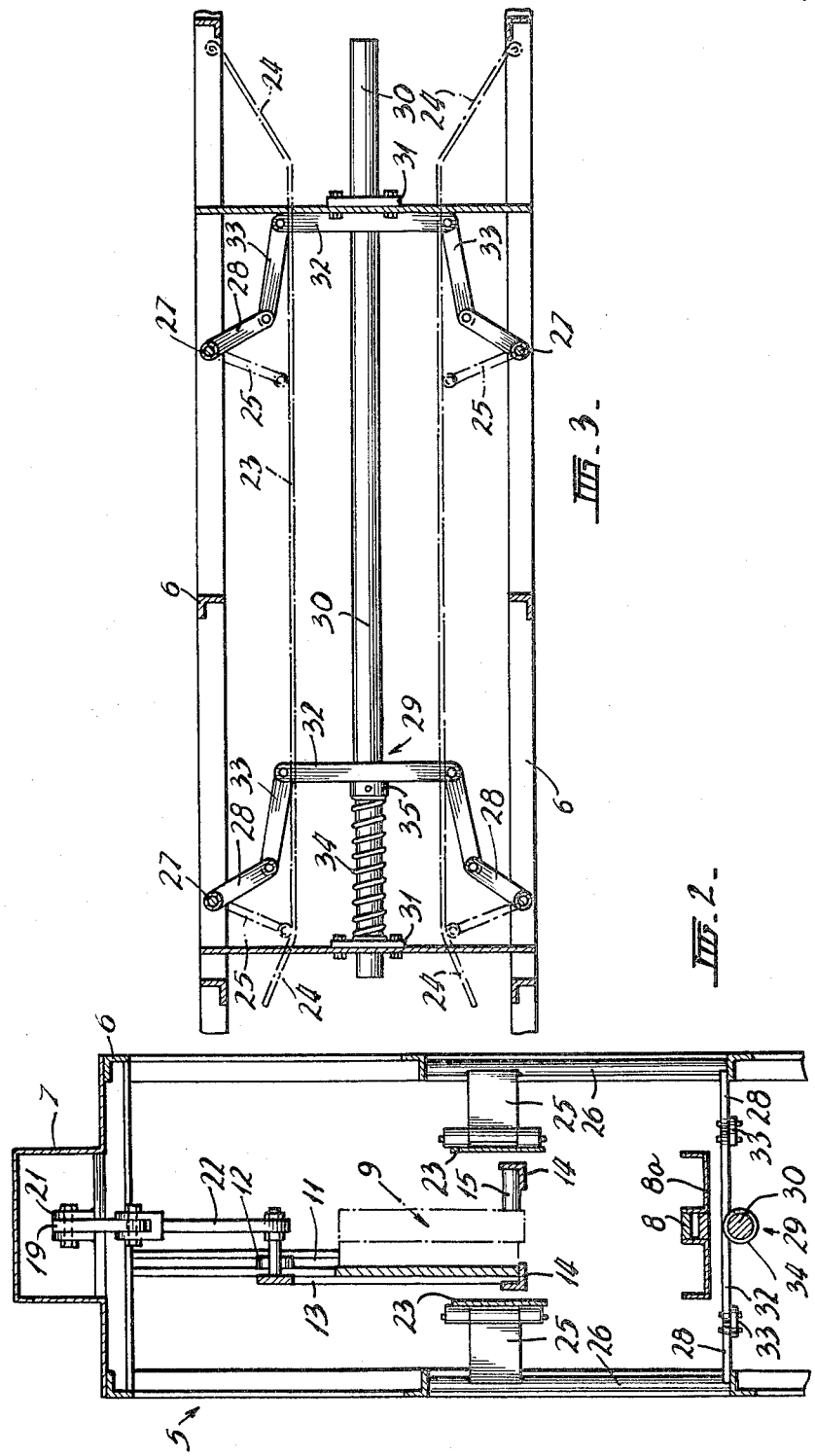

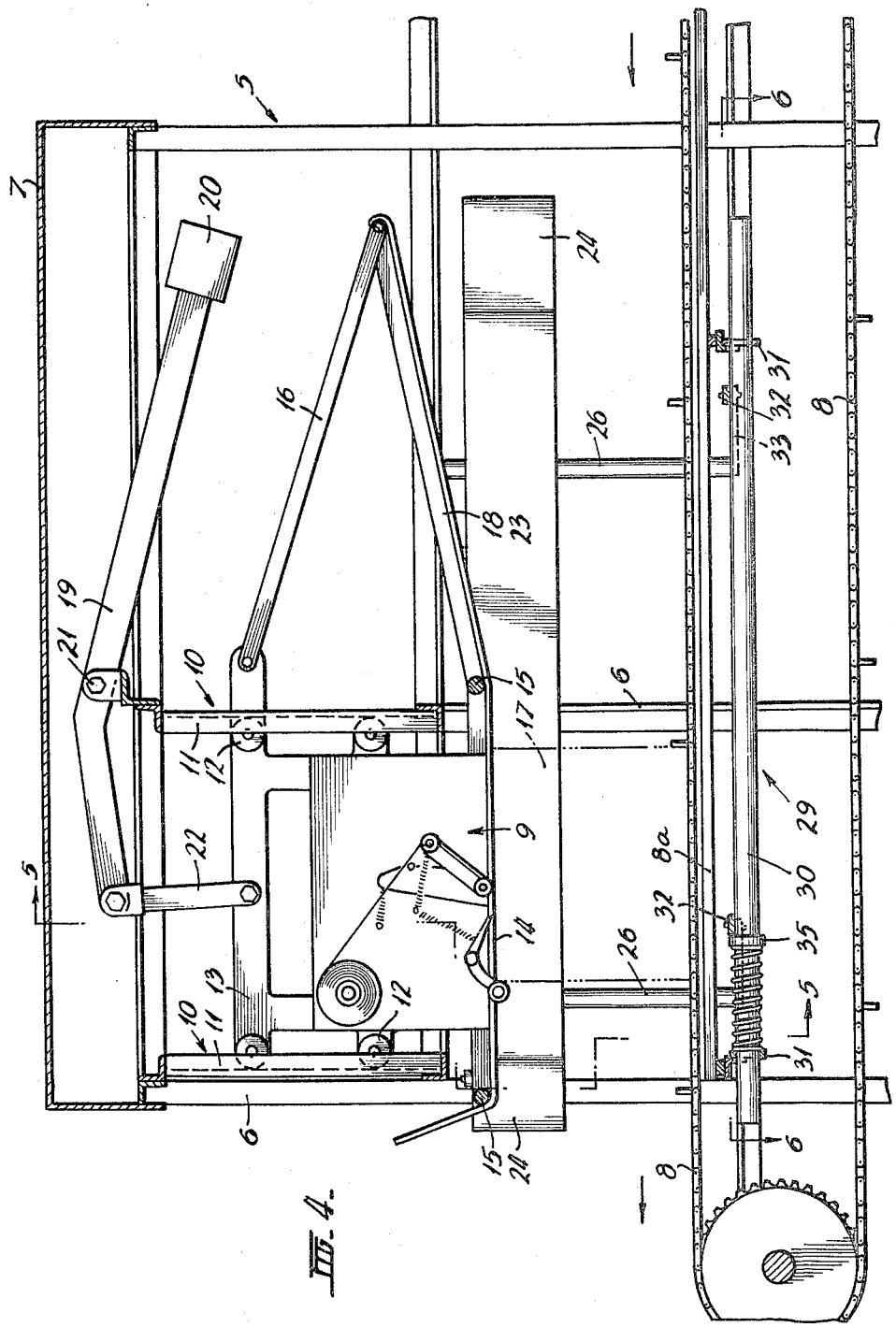

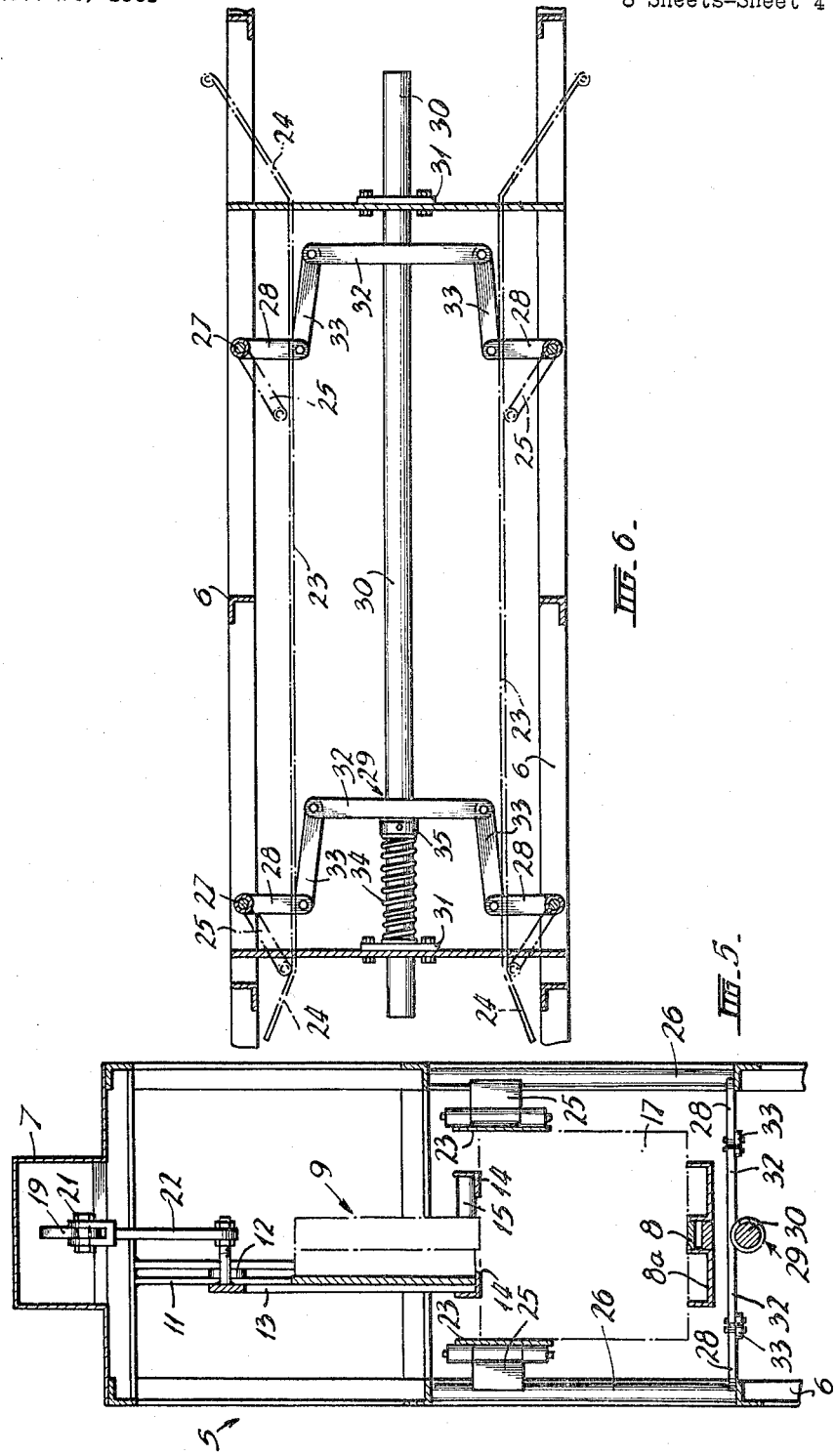

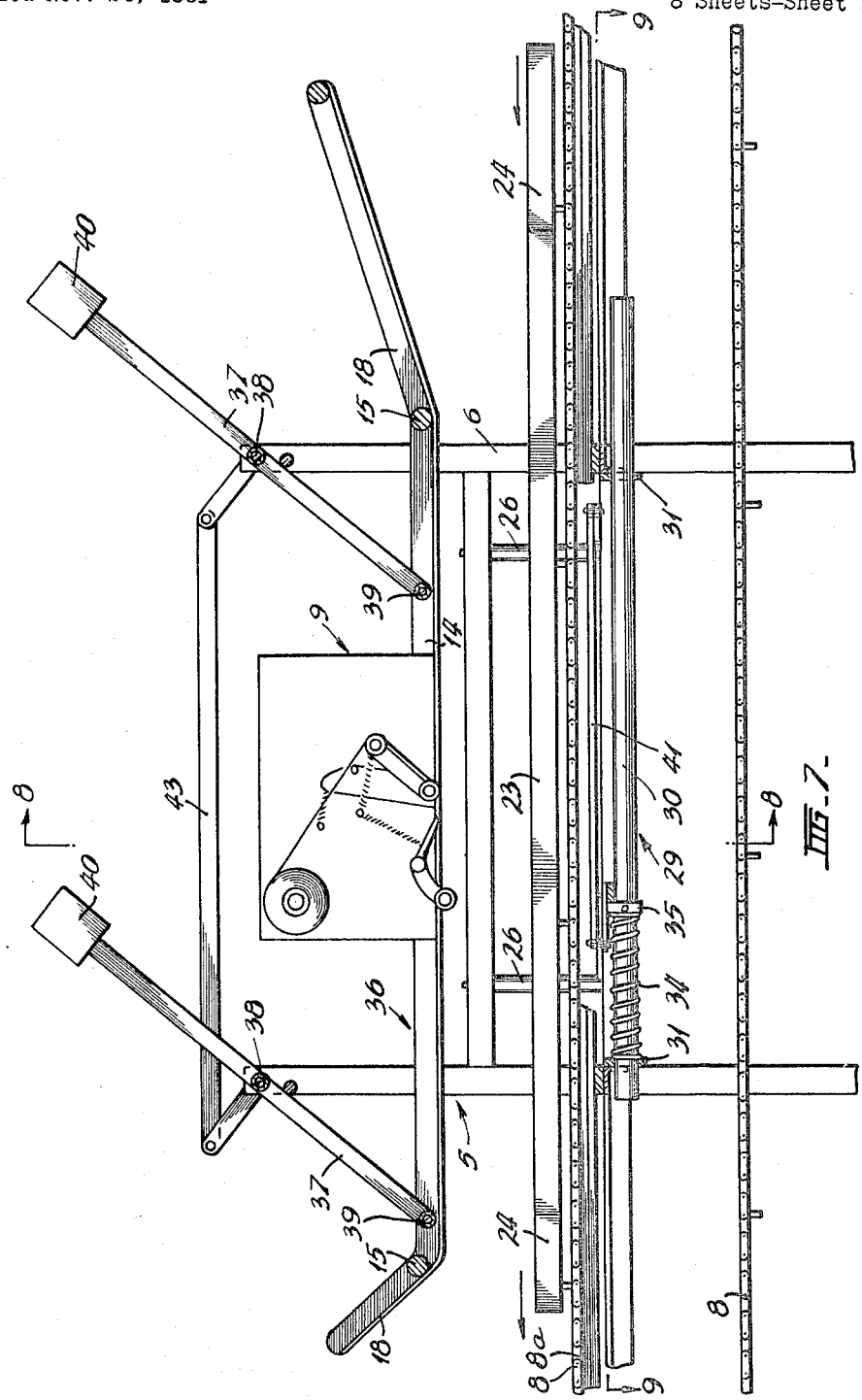

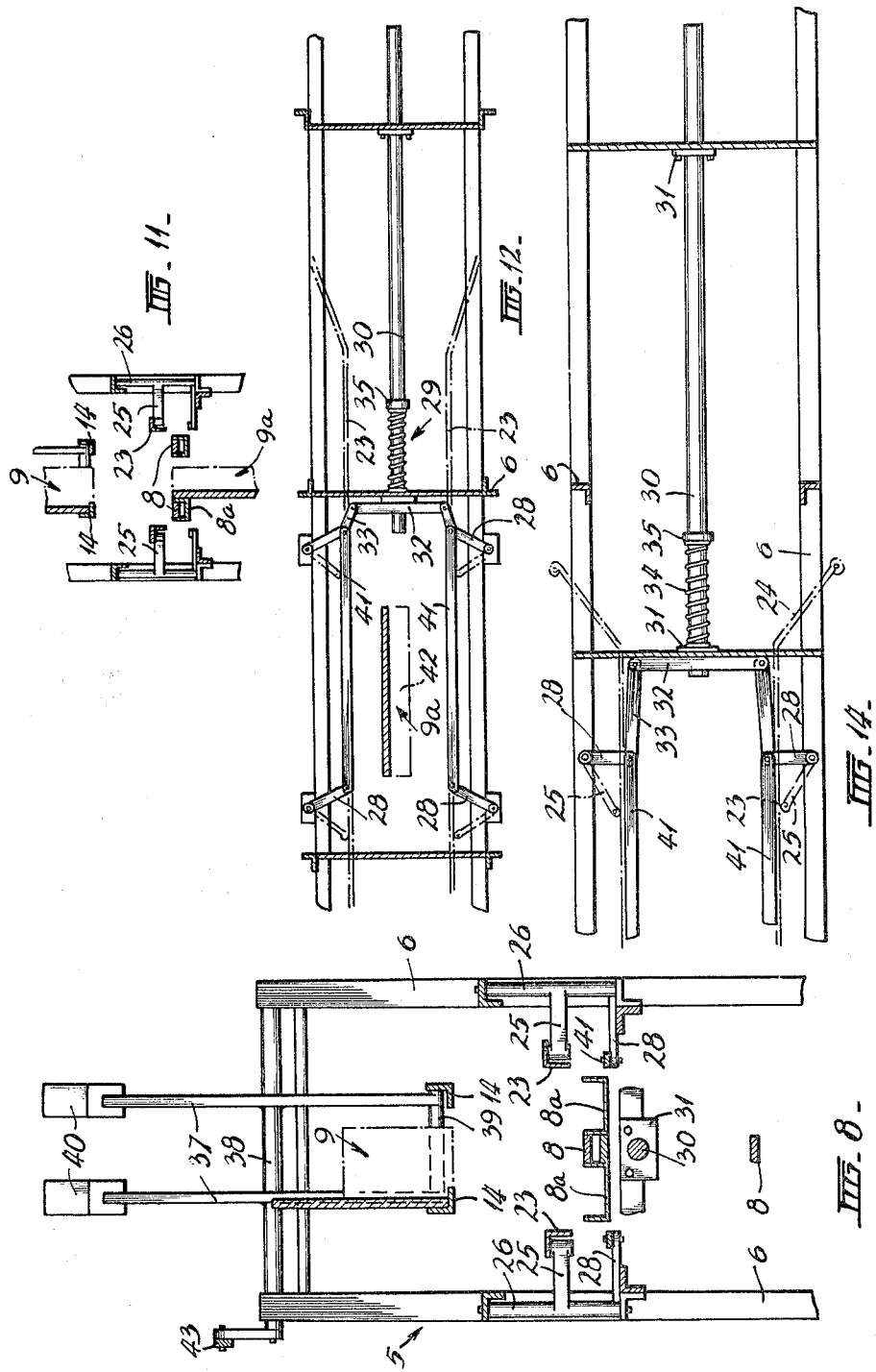

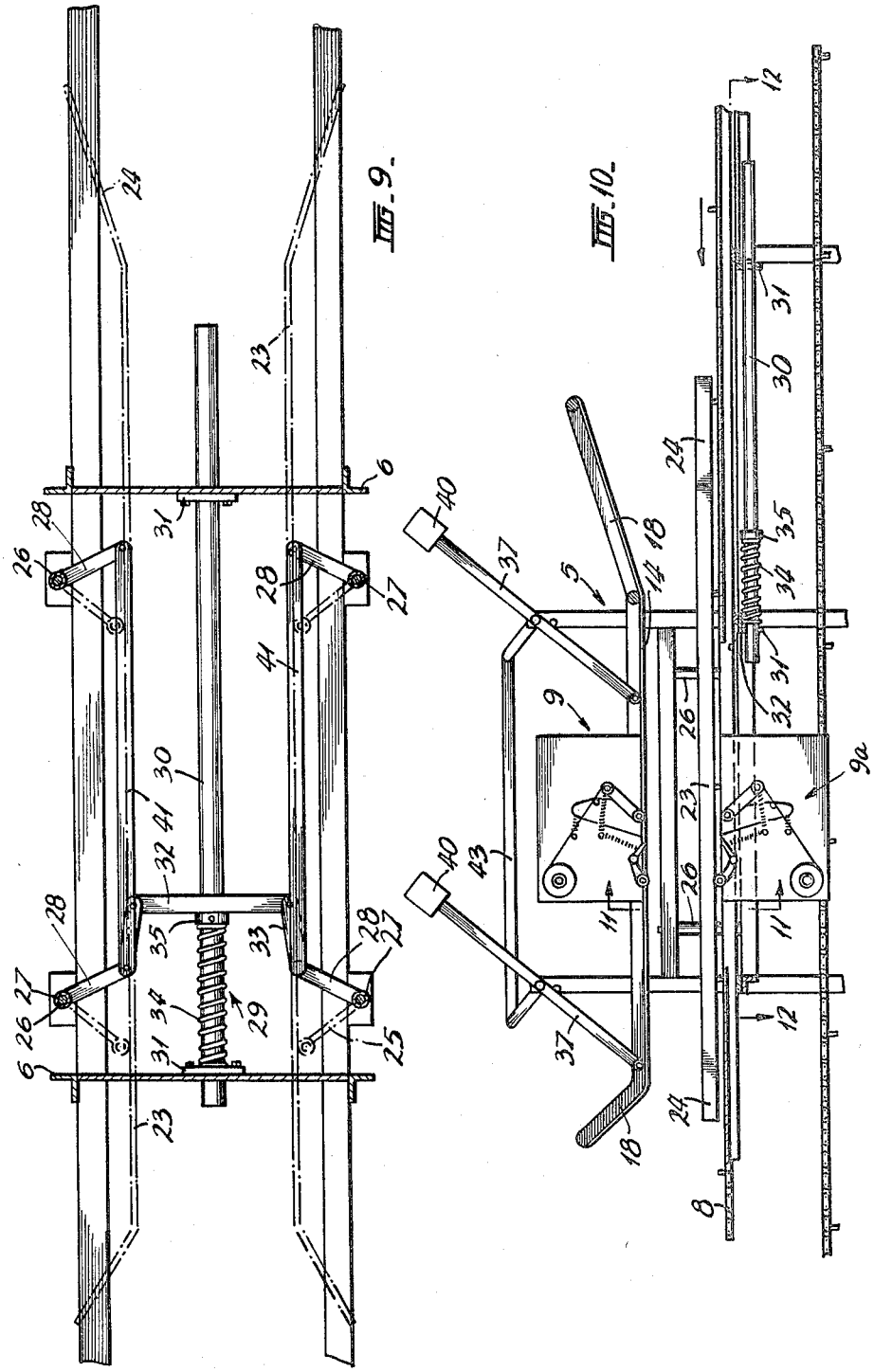

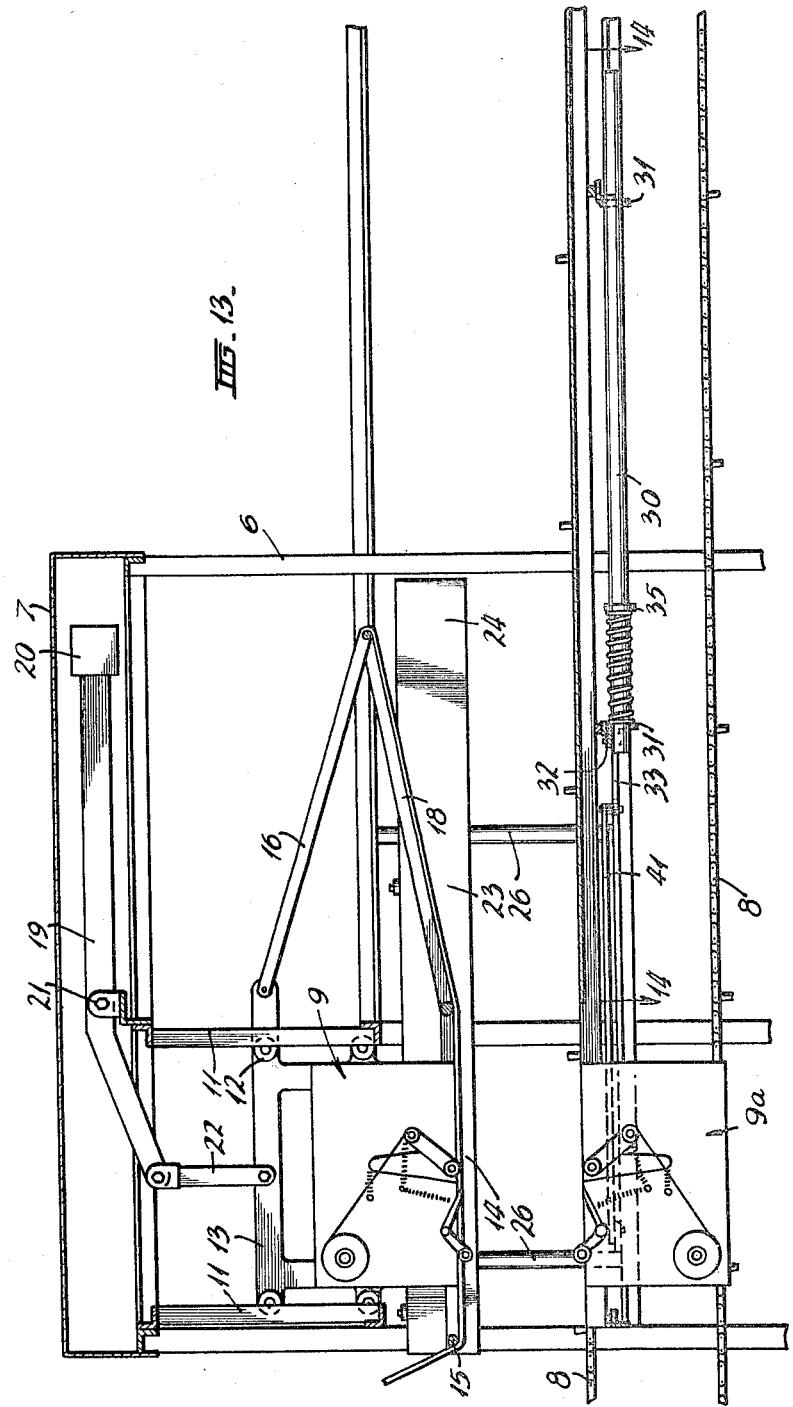

This invention relates to an improved apparatus for sealing packages, cartons, and the like and, in particular, relates to an apparatus for applying an adhesive sealing strip or strips to effect sealing of the cartons or packages.

The present invention has been devised particularly, but not exclusively, for sealing cardboard cartons by applying a strip of adhesive tape or the like across the closed flaps of a carton.

Adhesive strip dispensing and cutting mechanisms for use in sealing machines operating on packages are known, but to date these mechanisms have only been adopted for machines adjusted to and operating on one particular size and shape of carton or package. This type of machine, although effective in its operation, suffers from the disadvantage that a manufacturer or packer is limited to one size of carton, once the machine has been adjusted for that particular size, and in the fruit packing industry, for example, where up to fifteen grades of one type of fruit may have to be packed in different sized cartons during the grading of a batch or picking of the fruit, it has hitherto proved to be a tedius, time and man-hour consuming operation to re-set or readjust the machine to seal the various sized cartons used in the packaging operation.

It is an object of the present invention to provide a strip sealing apparatus which will obviate the above-mentioned disadvantages and will automatically function to seal cartons or packages of various sizes and capacities, without requiring any manual adjustment of the machine to accommodate the various sized cartons.

It is also an object of the invention to provide such an apparatus which will also orient or align the cartons to be sealed as they pass through the apparatus so that the adhesive strip or strips are applied in the correct desired position or positions.

Another object of the invention is to provide in association with the sealing and aligning apparatus, a carton flap closing or folding device.

For convenience of reference, cartons, packages, bundles, and the like will hereinafter be referred to as "cartons."

With these objects in mind the present invention has been devised to provide an apparatus for sealing cartons, including applicator means movably mounted on the apparatus for feeding and applying an adhesive sealing strip to a carton, and means associated with the applicator means and adapted to be actuated by the carton being fed through the apparatus to locate the applicator means in its sealing position relative to the said carton.

The feeding means may comprise a chain type conveyor or the like passing through the apparatus, and the applicator means may comprise one or more known types of adhesive strip guiding, feeding and cutting devices, operably mounted in the apparatus. The actuating means preferably comprises a member connected to one applicator device and located in the path of a carton being fed into the apparatus so that the surface of the carton to be sealed, for example, the top of the carton, contacts and moves the actuating member, and with it the applicator device, to a position suitable for application of the sealing strip.

According to a further feature of the invention, two applicator devices are mounted in the machine, one above the carton to be sealed, and one below the carton, the lower applicator device being mounted for actuation by the carton moving through the machine.

According to a further aspect of the invention the apparatus also includes means for laterally aligning the cartons in their passage through the apparatus to correctly position the cartons relative to the applicator means. A flap closing or folding device may also be included in the apparatus to close the carton ready for application of the sealing strip.

In order that the invention and its manner of performance may be more fully described reference will now be made to the embodiments illustrated in the accompanying drawings, in which:

FIGURE 1 is a part-sectional side elevation of one embodiment of the apparatus of the invention, with the parts in their non-operating position;

FIGURE 2 is a part-sectional end elevation of the apparatus taken along the line 2—2 of FIGURE 1 in the direction of the arrows;

FIGURE 3 is a plan view of the carton guiding and aligning mechanism taken along the line 3—3 in the direction of the arrows;

FIGURE 4 is a part-sectional side elevation, similar to FIGURE 1, but showing the parts in an operative position;

FIGURE 5 is a similar view to FIGURE 2, showing an operative position of the parts of the apparatus with a carton passing therethrough, taken along the line 5—5 of FIGURE 4 in the direction of the arrows;

FIGURE 6 is a similar view to FIGURE 3 taken along the line 6—6 of FIGURE 4, but showing the guiding and aligning mechanism in an operative position;

FIGURE 7 is a part-sectional side elevation of a second embodiment of the apparatus of the invention with the parts in a non-operating position;

FIGURE 8 is an end view taken along the line 8—8 of FIGURE 7, in the direction of the arrows;

FIGURE 9 is a plan view of the carton guiding and aligning mechanism taken along the line 9—9 of FIGURE 7 in the direction of the arrows;

FIGURE 10 is a part-sectional side elevation of the apparatus of FIGURES 7 to 9 modified to include a lower tape applicator;

FIGURE 11 is an end view taken along the line 11—11 of FIGURE 10 in the direction of the arrows;

FIGURE 12 is a plan view, taken along the line 12—12 in the direction of the arrows, showing the modified location of the guiding and aligning mechanism;

FIGURE 13 is a part-sectional side elevation of the apparatus of FIGURES 1 to 6 modified to include a lower tape applicator; and FIGURE 14 is a plan view, taken along the line 14—14 of FIGURE 13 in the direction of the arrows, showing the modified location of the guiding and aligning mechanism.

Referring to the drawings, the apparatus shown in FIGURES 1 to 6 comprises a framework 5 of box-like construction formed of angle members 6 and cover member 7 with a feed conveyor 8 passing through the lower part of the framework between carton supporting members 8a at a convenient working level above the ground surface.

In the upper part of framework 5 a known type of feeding guiding and cutting device 9 for applying adhesive sealing strip is mounted on guides 10 for vertical movement in the framework. This known type of applicator 9 consists of a strip dispensing roll, movable guide and pressure roller and a solenoid operated cutting knife for severing the strip at the correct position for the particular size and shape of carton being sealed. This applicator per se does not form part of this invention.

The vertical guides are channel members 11 mounted on framework 5 of the apparatus and a mounting panel 13 of the applicator 9 is provided with rollers 12 or the like engaging in said channel members and guided therein for vertical movement relative to framework 5. To ensure ease of fitment of the applicator 9 and its panel 13 one or both of said channel members 11 are mounted for eccentric adjustment in the framework, said eccentrically adjustable member or members being swung away from the plane of movement of the applicator panel to allow fitment of rollers 12 or the like in the channel members. This eccentric adjustment of channel members 11 also provides for take up of wear and adjustment of alignment of rollers 12 in the channel members. The vertical guides may be of round section, and the applicator panel is provided with bushes at each end thereof for slidable movement on the guides.

Below applicator 9 a pair of height controlling bars 14 are located in a substantially horizontal plane and are connected to each other by cross members 15 and to the movable applicator panel by a fixed connecting bar or bracing member 16. The fixed relationship between the bars 14 and the applicator 9 is such that when bars 14 rest on top of a carton 17 the applicator 9 is in its correct location for applying a sealing strip across the adjacent ends of the top closed flaps of the carton. Bars 14 extend horizontally beneath the applicator and are inclined upwardly at 18 towards the entry end of the framework to provide a lead in for cartons being fed into the apparatus. To enable the applicator and its panel to be moved with the minimum of effort and thus prevent damage to or stoppage of the cartons entering the apparatus, a counterbalance arm 19 and weight 20 are pivoted on the top of the framework at 21 and connected to the top of the movable applicator panel through strap 22.

The counterbalance means may, if desired, include a parallel linkage system or systems with one or more counterbalance weights and arms connected thereto. The parallel linkage system may also be connected to the height controlling bars.

It can thus be seen that irrespective of the height of the carton passing under the applicator 9, the applicator is automatically moved to its correct sealing position relative to the particular carton to be sealed when the carton passes under the height controlling bars 14 of the apparatus. The distance between controlling bars 14 in their highest position and the top run of conveyor 8 is chosen to suit the largest size normally encountered in the particular packing and sealing operations carried out by a manufacturer or packing business. For abnormally sized cartons, provision may be made in the apparatus for lowering conveyor 8 or lifting the part of the framework accommodating applicator 9 by inserting vertical spacing bars or supports in the centre part of the framework.

As cartons being fed to the apparatus are of various widths and pass along conveyor 8 in misalignment from the packing stations, means are provided for partially aligning the cartons prior to the apparatus and for positively aligning them as they pass through the apparatus so that the adjacent free ends of the carton closure flaps to be covered with the sealing strip are in correct alignment beneath the applicator.

The positive alignment means consist of a pair of elongated members 23, one on each side of the apparatus, the ends of members 23 being arcuately shaped at 24 so as to extend away from the inner part of the framework and provide a lead-in and clear release of the cartons entering and leaving the apparatus. The elongated members 23 extend from the entry end of the apparatus to the exit end are attached by arms 25 to tubular members 26 pivotally mounted on vertically disposed rods 27 secured between frame members.

The lower ends of tubular members 26 extend below the level of conveyor 8, and are each provided with an inwardly extending fixed arm 28 connected to a common biassing device 29 mounted on the framework longitudinally of and centrally of the apparatus beneath the conveyor.

The biassing device 29 consists of a shaft 30 mounted in bearing plates 31 detachably secured to the framework and having arms 32 connected thereto and extending normally to shaft 30 on each side thereof in a substantially horizontal plane. A pivoted link 33 is connected between the outer end of each arm 32 on shaft 30 and the fixed arm 28 of a tubular member. At one end of shaft 30 a helical spring 34 is located thereon between a bearing plate 31 and a collar member 35 adjustably located on shaft 30. Spring 34 acts on shaft 30 and its attached arms and links to bias elongated members 23 on each side of the apparatus towards each other and the spring force is selected by moving collar 35 on the shaft, so that the inwards biassing force applied to the elongated alignment members will not impede the movement of a carton through the apparatus. Elongated members 23 by reason of their mounting and connection to the spring loaded shaft, are always maintained in positions equally spaced on either side of the axial line of the shaft which coincides in the vertical plane with the centre of the sealing strip if the sealing strip is to be applied centrally of the carton.

When a carton contacts the lead-in ends of the elongated alignment members its weight and movement of the conveyor move the alignment member apart, and at the same time the members shift or lead the carton sideways on the conveyor so that the carton is contacted by both alignment members and thus correctly aligned with the applicator.

The partial alignment means (not shown) may consist of a set of elongated members and associated mechanism and linkage similar to the positive alignment means above described, with the distance between elongated members at their innermost position somewhat greater than in the case of the positive alignment means if desired. Furthermore, the spring pressure may be lighter in the partial alignment means to ensure that cartons in awkward alignment are not impeded in their passage through the apparatus. The partial alignment means are located a short distance from the main framework 5 at the feed-in end and, if desired, a simple hoop-shaped flap folding and closing member may also be located above or in the vicinity of the partial alignment means or between those means and the positive alignment means.

FIGURES 1, 2 and 3 show the applicator panel 13 at its lowermost rest position with rollers 12 engaging against the bottom ends of guide channels 11, and elongated members 23 at their innermost biassed positions with arm 32 remote from spring 34 engaging against a frame member acting as a stop means.

When a carton passes through the apparatus, as shown in FIGURES 4, 5 and 6, the panel and attached applicator 9 are moved upwardly in accordance with the height of the carton, and elongated members are moved outwardly of each other against the force of spring 34 so that they engage against but do not grip the sides of the carton, thus ensuring substantially unimpeded passage of the carton through the apparatus whilst effecting a positive centralisation of the carton below the applicator.

According to a further embodiment of the invention illustrated in FIGURES 7, 8 and 9, applicator 9 may be mounted on a cradle framework 36 for oscillating movement in the main framework 5 between a lower position relative to the conveyor 8 and a higher position.

The cradle framework 36 includes height control bars 14 inclined at 18 at the lead-in end and the discharge end and is movably mounted relative to the main framework 5 by means of longitudinally upwardly extending inclined arms or bars 37 pivotally mounted at 38 in the main framework and pivotally connected at their lower ends at 39 to the cradle framework. The upper ends of arms 37 are provided with counter-weights 40 which may be directly connected thereto or may be mounted for adjustment along the upper parts of arms 37 as for example by screw-threading the arms and locating the weights between locknuts or by mounting the weights on sleeves slidable and lockable on the upper parts of the arms. To ensure parallel movement of the bars 14, connecting link 43 is provided between arms 37.

As in the previously described embodiment, a carton contacting the height control bars 14 raises the bars and attached applicator 9 to the correct sealing position of the applicator. Counterbalance arms 37 and weights 40 assist in the raising of the bars 14 and applicator 9 and allow the conveyor to feed the carton through the machine with a minimum of impedance.

It is, in some cases, desirable to be able to adjust counterbalance weights 40 in accordance with the products and the cartons being packed and sealed. For example, when solid well packed cartons of tinned or canned products are being sealed the flaps may be well pressed down on top of the carton prior to the application of the sealing tape and for this type of sealing the weights may be adjusted towards the pivot points of the arms on the main framework. When loosely packed goods, such as apples and other fruits, are to be sealed in the cartons it is not desirable that the flaps should be pressed down too hard prior to sealing in view of consequent damage and the fact that voids between the packed articles may allow the meeting edges of the flaps to be pushed into the carton thus preventing an efficient sealing of the carton. For this type of sealing the weights may be adjusted outwardly away from the pivots on the main framework so as to give a light pressure sensitive counterbalance. This feature of adjustment of the counterbalance weights for the purpose described is also applicable to the embodiment illustrated in FIGURES 1 to 6.

The positive carton alignment means are similar in function to that illustrated in FIGURES 3 and 6 previously described with the omission of links 33 and bar 32 at the end of shaft 30 remote from spring 34 and the substitution of connecting parallel links 41 ensuring parallel movement of members 23 towards and away from each other. It will be appreciated that the alignment means of FIGURES 3 and 6 may also be arranged in this manner.

Partial alignment means and, if desired, flap closing means as previously described, may also be used in conjunction with the apparatus of FIGURES 7, 8, and 9. Such partial alignment means for both embodiments may consist of mechanism similar to the apparatus of FIGURES 7, 8 and 9 without the applicator 9 being mounted thereon.

FIGURES 10, 11 and 12 illustrate a modified construction of the apparatus of FIGURES 7, 8 and 9 incorporating a lower applicator 9a in addition to the upper applicator 9.

The height control mechanism and upper applicator mounting are the same as that described with reference to FIGURES 7, 8 and 9 and the elongated members 23 are also located as before. To allow the lower applicator 9a to operate, the conveyor 8 is formed of spaced apart chains running in channelled carton support members so as to leave sufficient space therebetween for actuation of applicator 9a on the lower surface of a carton through slot 42.

The location of the lower applicator also requires resiting and modifying of the alignment mechanism of the previous embodiments by moving shaft 30 forward of and clear of the slot 42 and attaching bar 32 near the end of the shaft adjacent spring 34 but on the other side of the bearing plate 31 adjacent the spring. Links 33 in this construction are connected to the links 28 at the feed-in end of the machine.

FIGURES 13 and 14 illustrate the embodiment of FIGURES 1 to 6 modified to accommodate a lower applicator 9a in similar fashion to the embodiment illustrated in FIGURES 10, 11 and 12.

With the apparatus of the present invention it will be appreciated that cartons of varying heights and widths and any length may be fed through the apparatus in any sequence, the height controlling and alignment members functioning to automatically position the upper applicator and the carton to be sealed in their correct relative positions, and no manual control or adjustment is required as different shaped cartons within the range handled by the particular apparatus are fed to the apparatus. When sealing of the lower flaps of a carton is required as well as the upper flaps a lower applicator is located in the machine as illustrated in FIGURES 10 to 14 and operates at the same time as the upper applicator to apply a strip across the lower carton flaps.

It will be appreciated that the apparatus of the present invention may also be used to apply strips of adhesive tape or the like to cartons for marking and advertising purposes.

I claim:

1. An apparatus for applying a strip of adhesive tape to cartons, including conveyor means for feeding cartons through the apparatus, tape applicator means for feeding and applying an adhesive strip to a carton, applicator height control means connected to the applicator and operable on engagement with a carton being fed through the apparatus to position the applicator in its correct location for applying a strip to said carton, and guide means for laterally aligning the cartons being fed to and through the apparatus, said guide means comprising partial alignment means at the feed-in end of the apparatus for partially aligning the cartons in their desired orientation for application of the adhesive tape, and positive alignment means including elongated members spring biassed toward each other for laterally positioning and guiding the oriented cartons passing through the apparatus and past the tape applicator means, said applicator height control means being provided with counterbalance means to prevent impedence of the cartons on engagement with the height control means.

2. An apparatus for applying an adhesive tape, strip or the like to cartons, including a conveyor for feeding cartons through the apparatus, a tape applicator mounted for movement in a vertical plane in the apparatus and operable to apply a length of tape to a carton passing thereunder, height control means operatively connected to the tape applicator and mounted on the apparatus for actuation by a carton passing therethrough to move the tape applicator to an operative position for applying tape to said carton, and guide means on the apparatus for automatically aligning the carton in its desired lateral position relative to the tape applicator as the carton is fed towards and under the tape applicator, said guide means including elongated opposed members biassed toward each other and movable toward and away from each other, said guide means extending through the apparatus above the conveyor and at each side of the centre line thereof, said elongated members being biassed toward each other by adjustable resilient means, said height control means being attached to a panel on which is mounted the tape applicator, the panel being slidably located in vertical guides adjustably mounted in the framework of the apparatus.

3. An apparatus for applying an adhesive tape, strip or the like to cartons, including a conveyor for feeding cartons through the apparatus, a tape applicator mounted for movement in a vertical plane in the apparatus and operable to apply a length of tape to a carton passing thereunder, height control means operatively connected to the tape applicator and mounted on the apparatus for actuation by a carton passing therethrough to move the tape applicator to an operative position for applying tape to said carton, and guide means on the apparatus for automatically aligning the carton in its desired lateral position relative to the tape applicator as the carton is fed towards and under the tape applicator, said guide means including elongated opposed members biassed toward each other and movable toward and away from each other, said guide means extending through the apparatus above the conveyor and at each side of the centre lines thereof, said elongated members being biassed toward each other by adjustable resilient means, said height control means comprising a cradle structure on which is mounted the tape applicator, the cradle structure being pivotally mounted in the framework of the apparatus and counterbalanced for oscillating movement in a vertical plane.

4. An apparatus for applying a strip of adhesive tape to cartons, including conveyor means for feeding cartons through the apparatus, tape applicator means for feeding and applying an adhesive strip to a carton, applicator height control means connected to the applicator and operable on engagement with a carton being fed through the apparatus to position the applicator in its correct location for applying a strip to said carton, and guide means for laterally aligning the cartons being fed to and through the apparatus, said guide means comprising partial alignment means at the feed-in end of the apparatus for partially aligning the cartons in their desired orientation for application of the adhesive tape, and positive alignment means including elongated members spring biassed toward each other for laterally positioning and guiding the orientated cartons passing through the apparatus and past the tape applicator means, said applicator height control means being provided with counterbalance means to prevent impedance of the cartons on engagement with the height control means, said height control means also acting to hold the flaps of the cartons in the desired closed position for application of the adhesive tape thereto.

5. An apparatus for applying an adhesive tape, strip or the like to cartons, including a conveyor for feeding cartons through the apparatus, a tape applicator mounted for movement in a vertical plane in the apparatus and operable to apply a length of tape to a carton passing thereunder, height control means operatively connected to the tape applicator and mounted on the apparatus for actuation by a carton passing therethrough to move the tape applicator to an operative position for applying tape to said carton, and guide means on the apparatus for automatically aligning the carton in its desired lateral position relative to the tape applicator as the carton is fed towards and under the tape applicator, said guide means including elongated opposed members biassed toward each other and movable toward and away from each other, said guide means extending through the apparatus above the conveyor and at each side of the centre lines thereof, said elongated members being biassed toward each other by adjustable resilient means, said height control means being attached to a panel on which is mounted the tape applicator, the panel being slidably located in vertical guides adjustably mounted in the framework of the apparatus, said height control means also acting to hold the flaps of the cartons in the desired closed position for application of the adhesive tape thereto.

6. An apparatus for applying a strip of adhesive tape to cartons, including conveyor means for feeding cartons through the apparatus, tape applicator means for feeding and applying an adhesive strip to a carton, applicator height control means connected to the applicator and operable on engagement with a carton being fed through the apparatus to position the applicator in its correct location for applying a strip to said carton, and guide means for laterally aligning the cartons being fed to and through the apparatus, said guide means comprising partial alignment means at the feed-in end of the apparatus for partially aligning the cartons in their desired orientation for application of the adhesive tape, and positive alignment means including elongated members spring biassed toward each other for laterally positioning and guiding the orientated cartons passing through the apparatus and past the tape applicator means, said applicator height control means being provided with counterbalance means to prevent impedance of the cartons on engagement with the height control means, and a second applicator means mounted below the conveyor and operable to apply an adhesive strip to the lower surface of a carton.

7. An apparatus for applying an adhesive tape, strip or the like to cartons, including a conveyor for feeding cartons through the apparatus, a tape applicator mounted for movement in a vertical plane in the apparatus and operable to apply a length of tape to a carton passing thereunder, height control means operatively connected to the tape applicator and mounted on the apparatus for actuation by a carton passing therethrough to move the tape applicator to an operative position for applying tape to said carton, and guide means on the apparatus for automatically aligning the carton in its desired lateral position relative to the tape applicator as the carton is fed towards and under the tape applicator, said guide means including elongated opposed members biassed toward each other and movable toward and away from each other, said guide means extending through the apparatus above the conveyor and at each side of the centre line thereof, said elongated members being biassed toward each other by adjustable resilient means, said height control means being attached to a panel on which is mounted the tape applicator, the panel being slidably located in vertical guides adjustably mounted in the framework of the apparatus, and a second applicator means mounted below the conveyor and operable to apply an adhesive strip to the lower surface of a carton.

8. An apparatus for applying an adhesive tape, strip or the like to cartons, including a conveyor for feeding cartons through the apparatus, a tape applicator mounted for movement in a vertical plane in the apparatus and operable to apply a length of tape to a carton passing thereunder, height control means operatively connected to the tape applicator and mounted on the apparatus for actuation by a carton passing therethrough to move the tape applicator to an operative position for applying tape to said carton, and guide means on the apparatus for automatically aligning the carton in its desired lateral position relative to the tape applicator as the carton is fed towards and under the tape applicator, said guide means including elongated opposed members biassed toward each other and movable toward and away from each other, said guide means extending above the conveyor and at each side of the center line thereof, and means for biassing said elongated members toward each other, said height control means being attached to a panel on which is mounted the tape applicator, the panel being slidably located in vertical guides mounted in the framework of the apparatus.

(References on following page)

References Cited by the Examiner

UNITED STATES PATENTS

| | | | |
|---|---|---|---|
| 749,681 | 1/1904 | Beardsley | 53—374 |
| 2,244,873 | 6/1941 | Ferguson | 53—374 X |
| 2,550,928 | 5/1951 | Kay | 53—75 |
| 2,649,221 | 8/1953 | Wagner et al. | 53—137 |
| 2,776,068 | 1/1957 | Johnson | 156—351 |
| 2,841,305 | 7/1958 | Werner | 156—355 |

FOREIGN PATENTS 1,050,697  2/1959  Germany.

TRAVIS S. McGEHEE, *Primary Examiner.*

EARL M. BERGERT, *Examiner.*

D. J. DRUMMOND, L. S. BOUCHARD,
*Assistant Examiners.*